No. 677,290. Patented June 25, 1901.
P. W. TILLINGHAST.
PNEUMATIC TIRE.
(Application filed Aug. 2, 1900.)

(No Model.)

Witnesses
Inventor

UNITED STATES PATENT OFFICE.

PARDON W. TILLINGHAST, OF EDGEWOOD, RHODE ISLAND.

PNEUMATIC TIRE.

SPECIFICATION forming part of Letters Patent No. 677,290, dated June 25, 1901.

Application filed August 2, 1900. Serial No. 25,714. (No model.)

*To all whom it may concern:*

Be it known that I, PARDON W. TILLINGHAST, a citizen of the United States, residing at Edgewood, in the county of Providence and State of Rhode Island, have invented a new and useful Improvement in the Construction of Pneumatic Tires, of which the following is a specification.

My invention relates to the fabric forming the strength of a tire and to its application.

It is essential in building a large-section automobile-tire that the fabric and rubber composing it should be inseparably united. I accomplish this result by making the tire substantially a single tube of rubber having embedded therein fibrous threads, preferably in several plies or layers, the plies being preferably separated from each other by intervening rubber and having the outer plies of fabric of a more open weave or construction than the ply or plies first applied. The preferred weave or construction of the fabric is alternately open and close.

Figure 1:
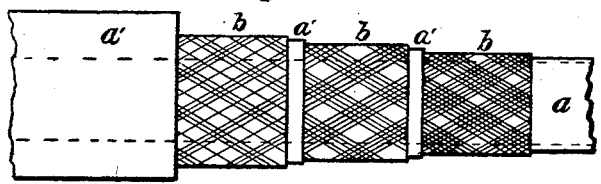
Figure 2:
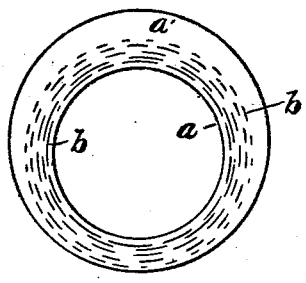
Figure 3:
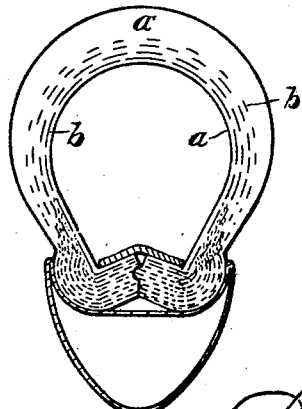

In the accompanying drawings, Figure 1 is a portion of a pneumatic tire in which the outer plies of fabric have a more open construction than the plies first applied. It also illustrates a fabric having an alternately open and close weave or construction. Fig. 2 is a transverse section of a pneumatic tire, showing successive plies of fabric having a more open weave or construction than the previously-applied plies. Fig. 3 is a transverse section of a cover for a tube, illustrating the adaptability of my invention to a double-tube tire.

I construct the tire of an air-tube $a$, of rubber, plies of fabric $b$, and additional rubber $a'$, preferably vulcanized into the form of a single-tube tire. Where it is desired to apply a plurality of windings, wrappings, or layers of fabric, I prefer to have each successive ply $b$ of a more open weave or construction than the preceding ply or plies. The rubber $a$ $a'$ not only adheres to the fabric $b$ at the sets of threads most closely woven or constructed, but becomes united in one mass at every point of contact one part with the other through the openings or blank spaces between the said threads or sets of threads during the process of vulcanization, thus forming a tire in which the rubber is substantially a single tube or mass having embedded therein a desired number of threads to prevent bursting and that bind the whole structure into an inseparable, homogeneous, and substantially indestructible body.

A tire constructed according to my invention will be very active and susceptible, its sensitiveness and life being due largely to the more or less open construction of the fabric and to the elasticity of the rubber in the openings. The fabric first applied may be closely woven; but I prefer to have some, if not all, of the meshes in said fabric more or less open, so that the air-tube $a$ may unite with the rubber $a'$ on the exterior of said fabric.

It is not necessary to make each successive ply of fabric of a more open construction than its predecessor, as two or more plies of a similar construction may be used successively, and I may diminish the activity in the tread of the tire by means of a fabric having a small mesh; but it is preferred to have most, if not all, of the outer plies present more open meshes to the surrounding rubber than the ply nearest to the air-tube $a$. This may be accomplished by using smaller threads or a less number in the construction of the outer plies. Woven, wound, or other fabric may be used.

I may also make a double-tube tire, as shown in Fig. 3. In this form of tire I prefer to have the innermost ply of fabric of a closer weave than in the first-named construction. The required air-tube is not shown in this view.

I disclaim and abandon all title to a tire composed of rubber and fabric, said fabric being tightly woven, but having rows of perforations therein extending parallel to the warp and weft threads thereof, and I also disclaim and abandon all title to a tire composed of rubber and fabric, said fabric having its warp and weft threads caused to form rectangular blank spaces or perforations.

Experience has proved that perforations in a tire fabric are injurious and that a tire having a fabric with rectangular spaces or meshes will increase in length, rendering it difficult to confine on a rim.

The separation of the threads of a fabric into sets is admitted and recognized as being old in the tire-making art. It is also recognized and admitted as being old to bind together or unite plies of fabric by bodies of rubber extending through meshes in said fabric, together with the cushioning effect of the rubber in said spaces resisting strain on the fabric in directions oblique to the threads thereof.

I claim as my invention—

1. In a pneumatic tire a strengthening fabric, consisting of a plurality of layers or plies, successive plies having a more open weave or construction than the preceding plies, forming a fabric with a broken plane or surface line, completely filled in and around with rubber, substantially as described.

2. In a pneumatic tire, a strengthening fabric, consisting of a plurality of plies, the outermost plies having a more open weave or construction than the plies first applied to the air-tube, so that the outer rubber is in direct and continuous communication with the fabric first applied, by means of openings or passages through the subsequently-applied plies, the whole blended into a homogeneous mass of rubber, with fibrous threads extending throughout the mass that bind the whole into a substantially indestructible body.

3. A pneumatic tire, consisting substantially of a single tube or mass of rubber, having embedded therein a desired number of plies of threads one or more of them applied in a more open construction than other threads to prevent bursting and that bind the whole structure into an inseparable and substantially indestructible body.

4. In a pneumatic tire, a covering for an air-tube, consisting substantially of a single tube or mass of rubber, having embedded therein a desired number of plies of threads one or more of them applied in a more open construction than other threads to prevent bursting and that bind the whole structure into an inseparable and substantially indestructible body.

In testimony whereof I have signed my name to this specification in the presence of two subscribing witnesses.

PARDON W. TILLINGHAST.

Witnesses:
JOHN HENSHAW,
EDWIN P. ALLEN.